(12) United States Patent
Zajac et al.

(10) Patent No.: US 12,492,145 B2
(45) Date of Patent: Dec. 9, 2025

(54) METHOD AND DEVICE FOR CARBONATION

(71) Applicant: HSustainability GmbH, Heidelberg (DE)

(72) Inventors: Maciej Zajac, Heidelberg (DE); Nicolas Pato, Heidelberg (DE); Jan Skocek, Heidelberg (DE)

(73) Assignee: HSustainability GmbH, Heidelberg (DE)

( * ) Notice: Subject to any disclaimer, the term of this patent is extended or adjusted under 35 U.S.C. 154(b) by 266 days.

(21) Appl. No.: 18/280,296

(22) PCT Filed: Mar. 2, 2022

(86) PCT No.: PCT/EP2022/055293
§ 371 (c)(1),
(2) Date: Sep. 5, 2023

(87) PCT Pub. No.: WO2022/194559
PCT Pub. Date: Sep. 22, 2022

(65) Prior Publication Data
US 2024/0067565 A1 Feb. 29, 2024

(30) Foreign Application Priority Data
Mar. 18, 2021 (EP) .................... 21163464

(51) Int. Cl.
*C04B 20/02* (2006.01)
*C04B 18/04* (2006.01)
*C04B 18/06* (2006.01)

(52) U.S. Cl.
CPC ........ *C04B 20/023* (2013.01); *C04B 18/0418* (2013.01); *C04B 18/06* (2013.01)

(58) Field of Classification Search
CPC ... C04B 20/023; C04B 18/0418; C04B 18/06; C04B 18/141; C04B 18/16; B03B 5/32; B04B 1/10
See application file for complete search history.

(56) References Cited

U.S. PATENT DOCUMENTS

| | | | | |
|---|---|---|---|---|
| 2009/0301352 A1* | 12/2009 | Constantz | ............. | B01D 53/62 |
| | | | | 106/668 |
| 2016/0160131 A1* | 6/2016 | Perez-Cordova | ...... | C10G 11/08 |
| | | | | 422/198 |

FOREIGN PATENT DOCUMENTS

| | | | | |
|---|---|---|---|---|
| EP | 3498681 A1 * | 6/2019 | ........... | C04B 18/167 |
| EP | 3 724 147 B1 | 5/2022 | | |

(Continued)

OTHER PUBLICATIONS

International Search Report in PCT/EP2022/055293, mailed May 19, 2022.

(Continued)

*Primary Examiner* — Pamela H Weiss
(74) *Attorney, Agent, or Firm* — Collard & Roe, P.C.

(57) ABSTRACT

A method for converting a starting material containing at least 40 wt.-% of calcium silicon (hydr)oxide phases and calcium aluminum (hydr)oxide phases into an SiO2 rich SCM and a calcium carbonate additive includes the steps: providing the starting material with a $D_{90}$ of ≤1 mm, mixing the starting material with water or adjusting the water content to provide a starting material slurry having a solid: liquid weight ratio from 2:1 to 1:100, passing the starting material slurry together with carbon dioxide into a gravity separation reactor, subjecting the starting material slurry and carbon dioxide to centrifugal motion inside the reactor, and removing a heavy slurry from a first outlet of the reactor, removing a light slurry of lower density particles from a (Continued)

second outlet of the reactor, and removing liquid at a third outlet of the reactor.

16 Claims, 2 Drawing Sheets

(56) References Cited

FOREIGN PATENT DOCUMENTS

| GB | 754544 A | * | 8/1956 | ............ C02F 1/5281 |
|---|---|---|---|---|
| GB | 2 076 316 A | | 5/1981 | |
| WO | WO-2010132863 A1 | * | 11/2010 | ............ C01B 32/50 |
| WO | 2014/154741 A1 | | 10/2014 | |
| WO | 2019/093726 A1 | | 5/2019 | |
| WO | 2019/115722 A1 | | 6/2019 | |
| WO | WO-2019110280 A1 | * | 6/2019 | ............ C04B 28/12 |
| WO | 2020/239681 A1 | | 12/2020 | |

OTHER PUBLICATIONS

International Preliminary Report on Patentability in PCT/EP2022/055293, mailed Sep. 6, 2022.

European Search Report dated Sep. 6, 2021 in European Application No. 21163464.7.

Skocek et al. "Carbon Capture and Utilization by mineralization of cement pastes derived from recycled concrete" Sci Rep 10, 5614 (2020).

* cited by examiner

METHOD AND DEVICE FOR CARBONATION

CROSS REFERENCE TO RELATED APPLICATIONS

This application is the National Stage of PCT/EP2022/055293 filed on Mar. 2, 2022, which claims priority under 35 U.S.C. § 119 of European Application No. 21163464.7 filed on Mar. 18, 2021, the disclosure of which is incorporated by reference. The international application under PCT article 21(2) was not published in English.

The present invention relates to a method and device for carbonation as well as to a novel supplementary cementitious material and calcium carbonate additive and their use.

Cement industry is struggling with high $CO_2$ emissions related to the production of cement clinker. A major part of the $CO_2$ emissions related to the clinker production originates from the raw materials used, i.e. from limestone. As environmentally friendlier alternatives to limestone do not exist at large enough scale reduction of the raw material emissions by limestone substitution is not possible Reduction of cement and concrete industry environmental footprint by utilization of industrial by-products used as supplementary cementitious materials (SCM) has reached global availability limits of these materials. Furthermore, the availability of the two most important SCMs—fly ashes and blast furnace slags—is expected to decrease with the progressing decarbonisation of the electricity sector and increased steel recycling, respectively. As a result, limestone and potentially clays, that need to be calcined, are the only SCMs available in sufficient amounts to meet the increasing cement demands. However, the production of calcined clay, i.e. grinding, drying, calcination, may be related to the significant $CO_2$ emissions as well.

The $CO_2$ emissions may be limited by the further optimization of the cement clinker production. However, such development is limited because of the technological barriers.

The only large-scale $CO_2$ abatement measure is then the post-production carbon capture and storage (CCS) or utilization (CCU). Carbon capture technologies such as amine-based $CO_2$ scrubber, membrane-based gas separation, oxyfuel kiln lines or indirect calcination of the calcium carbonate are needed for the CCS to work efficiently. The storage of $CO_2$ has several social and technical constrains, still being the most promising short-term solution for the cement industry. Nonetheless, the pursuit of the alternative solutions is ongoing and particular focus is on CCU solutions. The $CO_2$ captured from the cement industry can be used for the food industry or during the oil recovery. However, the volume of the $CO_2$ gases currently used for both applications is significantly lower compared to the volume of the $CO_2$ emitted during the cement production. Consequently, alternative solutions are needed.

One promising approach is a carbonation of concrete waste. Demolition of concrete structures yields crushed concrete which can either be used as such e.g. for road support or it can be separated into recycled concrete aggregate (RCA) and recycled concrete fines (RCF). Numerous proposals have been made to convert recycled concrete fines into SCM by carbonation, see for example WO 2020/239681 A1, EP 3 724 147 A1 and the article Skocek et al. "Carbon Capture and Utilization by mineralization of cement pastes derived from recycled concrete", Sci Rep 10, 5614 (2020) (https://doi.org/10.1038/s41598-020-62503-z) and references cited therein. Carbonated RCF as SCM are advantageous in that they allow reuse of waste as valuable product and sequester carbon dioxide at the same time.

Unfortunately, carbonation of dry RCF is time consuming and wet carbonation loses much of the benefit by necessitating drying of the product. Moreover, known separation of RCA from RCF leaves varying and considerable amounts of fine aggregate in the RCF fraction. This applies even when an improved separation method as described in e.g. WO 2014/154741 A1 proposing carbonation while applying attrition forces is used. Thereby, in addition to the recycled concrete paste (RCP) the carbonated RCF contains significant amounts of the aggregates that are inert with respect to the carbonation and hydration reaction. Consequently, when applying the carbonated RCP as SCM for the composite cement production, these aggregates dilute the reactive components resulting in a lower mechanical performance. Furthermore the main component of the carbonated cement paste is calcium carbonate, whose content can vary between 20-70% for the fully carbonated material. This further limits the amount of the pozzolanic reactive Al—Si gel.

Thus, the objects remain to find improved means for reusing concrete demolition waste and provide high performance SCM to minimize the environmental footprint of cement.

Surprisingly it was now found that carbonation of RCF and similar waste materials inside a gravity separation reactor allows conversion into a reactive $SiO_2$ rich supplementary cementitious material and a relatively pure calcium carbonate additive as separate products when the starting material is enriched in hardened binder to contain at least 20-70 wt.-% calcium silicate hydrates and other carbonatable calcium phases like calcium aluminate hydrates, calcium silicate aluminate hydrates, calcium oxide, calcium silicates and calcium aluminates.

Thus, the present invention solves the afore mentioned problems by a method based on the special, wet carbonation of concrete fines derived from the recycled concrete and similar materials and a device for it. Specifically, the problem is solved by a method for converting a starting material containing at least 40 wt.-% calcium silicon (hydr)oxide phases and calcium aluminium (hydr)oxide phases into an $SiO_2$ rich supplementary cementitious material and a calcium carbonate additive comprising the steps:
  providing the starting material with a $D_{90}$ of ≤1 mm
  mixing the starting material with water or adjusting the water content to provide a starting material slurry having a solids:liquids weight ratio from 2:1 to 1:100
  passing the starting material slurry together with carbon dioxide into a gravity separation reactor,
  subjecting the starting material slurry and carbon dioxide to centrifugal motion inside the reactor and
  removing a slurry of higher density particles comprising the calcium carbonate additive formed by reaction of carbon dioxide with calcium ions dissolved or leached from the starting material from a first outlet of the reactor, removing a slurry of lower density particles comprising the undissolved $SiO_2$ rich remains of the starting material from a second outlet of the reactor, and removing liquid at a third outlet of the reactor.

The object is further achieved by a gravity separation reactor comprising an inlet for a slurry and an inlet for carbon dioxide or an inlet for a slurry premixed with carbon dioxide, a reaction chamber adapted to subject the introduced slurry to centrifugal motion, a first outlet for a heavy slurry of higher density particles, a second outlet for a light slurry of lower density particles and a third outlet for liquid.

According to the invention waste materials such as recycled concrete fines or recycled cement paste can be used to manufacture valuable supplementary cementitious materials and other value-added products by an enforced carbonation process in the special carbonation-gravity separation reactor.

To simplify the description the following abbreviations that are usual in the field of cement are used herein: H—$H_2O$, C—CaO, A—$Al_2O_3$, F—$Fe_2O_3$, M—MgO, N—$Na_2O$, K—$K_2O$, S—$SiO_2$ and \$—$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

The term "reactive" shall mean a hydraulic reactivity unless specified otherwise. Hydraulic reactivity designates the reaction of a compound with water or other water containing compounds to form hydrated phases including a reaction of two or more compounds occurring simultaneously.

Herein, clinker designates a sinter product obtained by burning a raw material at elevated temperature and containing at least one hydraulic phase. Burning means a change of one or more property of the starting material such as chemistry, crystallinity, phase composition, spatial arrangement and bonds of lattice atoms which is brought about by a supply of thermal energy. The starting material may be a single material, but usually it is a mixture. The starting material is typically finely ground and then designated as raw meal. The starting material may contain mineralizers, which are substances decreasing the temperature necessary for melting and/or act as fluxes and/or enhance clinker formation e.g. by forming solid solutions or stabilisation of phases. Mineralizers can be part of the starting material components or be added as separate component.

Cement designates a material that, after mixing with an aqueous liquid to form a paste, is able to develop mechanical strength by hydraulic reaction. Thus, cement mostly denotes a clinker ground with or without further components, but also mixtures like super sulphated cement, geopolymer binder, and hydraulic materials not obtained by sintering like a dicalcium silicate obtained by hydrothermal treatment. Composite cement or binder mixture means a mixture containing cement and a supplementary cementitious material. A cement, composite cement or binder is usually used adding water or another liquid and mostly also aggregate. Typically, admixtures and/or additives are added to the binder and/or the paste.

A supplementary cementitious material (SCM) is defined as a pozzolanic and/or latent hydraulic material useful to replace a part of the clinker in a binder. Latent hydraulic materials have a composition that allows hydraulic reaction upon contact with water, wherein typically an activator is needed to enable hardening within technically feasible times. Activator means a substance that accelerates the hardening of latent hydraulic materials. It can be an addition like sulfate or calcium (hydr)oxide and/or products of the hydraulic reaction of the ground clinker, e.g. calcium silicates liberate calcium hydroxide during hardening. Pozzolanic materials are characterized by a content of reactive silica and/or alumina which form strength providing calcium silicate hydrates and calcium aluminate hydrates, respectively, during hydration of the clinker together with the calcium hydroxides liberated. In practice the limit between latent hydraulic and pozzolanic materials is not well defined, for example fly ashes can be both latent hydraulic and pozzolanic depending on their calcium oxide content. Consequently, the term SCM designates both latent hydraulic as well as pozzolanic materials. However, not reactive or only slightly reactive materials like limestone that substantially do not take part in the hydraulic reactivity have to be clearly differentiated from SCM, with which they are sometimes summarized as mineral additions.

Hydraulically hardening building material means a wet mixture that is able to harden hydraulically, and comprises a cement or binder as well as optionally any other addition contained to adjust the properties like final strength, processability of the wet mixture and strength development properties, to the intended use of the building material. For example, a concrete used to build a bridge needs other properties than a screed for casting a floor or a mortar for laying bricks.

Building structure denotes the hardened building material, e.g. a pre-cast concrete element or a floor or a bridge part from cast in place concrete.

Carbonation or mineral carbonation is based on the reaction of $CO_2$ with metal oxide bearing materials to form insoluble carbonates, with calcium and magnesium being the most important metals. Additionally to the carbonates, secondary materials can be produced.

Centrifugal force designates an outward fictitious force that is experienced by an object moving in a circular path directed away from the center of rotation, whose direction is away from the axis of rotation and is parallel to it, being equal in magnitude and dimensions with the centripetal force that acts towards the center of a circular path. The force does, however, depend on the mass of the object, the distance of the object from the center, and the speed of the rotation. Centrifugal force is applied in a centrifuge to isolate suspended particles from their surrounding medium on either a batch or a continuous process.

The method according to the invention includes three basic processes: providing a starting material slurry, carbonation of it, and separation of carbonates from $SiO_2$ rich products and of both from the main amount of water.

The first step of the method is a preparation of a starting material slurry comprising water and solids containing at least 40 wt.-% calcium silicon (hydr)oxide phases and typically also calcium aluminium (hydr)oxide phases as well as both of them with additional elements, predominantly iron and magnesium. Herein, calcium silicon (hydr)oxide phases and calcium aluminium (hydr)oxide phases means that a) calcium silicon oxide phases and calcium aluminium oxide phases, or b) calcium silicon hydroxide phases and calcium aluminium hydroxide phases, or c) calcium silicon hydroxide and oxide phases and calcium aluminium hydroxide and oxide phases, or d) any mixture thereof is present. With other words, the abbreviation "(hydr)oxide" designates oxides, hydroxides and their mixture. Preferably the solids contain at least 50 wt.-%, more preferred at least 60 wt.-%, most preferred at least 70 wt.-% of the calcium silicon (hydr)oxide phases and calcium aluminium (hydr)oxide phases. Useful raw materials for the solids are such that contain e.g., but not exclusively, calcium silicate hydrate, alite, belite, rankinite and wollastonite minerals/phases, calcium aluminium hydrates (e.g., but not limited to, hydrogarnet, ettringite, monosulfate, monocarbonate, hemicarbonate, hydrotalcite like phases), and calcium silicon/aluminium (hydr)oxides with additional elements such as, but not limited to, iron and magnesium. These phases are summarized as C—S—H herein. They can come from Portland clinker, special clinkers and/or as natural phases as raw material.

Preferred raw materials are waste materials and by-products, especially such that find no other beneficial use. Particularly preferred is concrete demolition waste and waste materials left over from concreting, e.g. but not exclusively washing water from cleaning concrete mixing devices and tools for placing concrete as well as discarded paste. Further, steel slag, ashes, and muds are suitable. High quality waste and by-products such as fly ashes and ground granulate blast furnace slag would of course be suitable. But they are preferably not used since being reactive SCM without further treatment they can be used as is for making hydraulic binders like composite cement. It is possible to mix two or more raw materials and/or different batches of one raw material to provide the starting material.

The starting material needs to have a $D_{90}$ of ≤1 mm, preferably of ≤500 µm, most preferred of 250 µm, to ensure fast enough carbonation. Typically, a C—S—H content of more than 40 wt.-% is found in RCF fractions with a $D_{90}$ of 150 µm or less, so the preferred $D_{90}$ for RCF as starting material is 150 µm or less, more preferred 125 µm or less, most preferred 100 µm or less. Since the raw materials will typically not dissolve in water the particles have to be small enough to allow dissolution/leaching of calcium ions into the water. Therefore, also other raw materials besides RCF are preferably used with the preferred $D_{90}$ mentioned above for RCF. Some waste materials and by products have inherently small enough particles, especially washing water from concreting. Other waste materials need crushing and/or grinding to achieve a suitable fineness. Further, it may be necessary to concentrate the raw materials in C—S—H to achieve the minimum amount of 40 wt.-% with respect to the solids in the starting material slurry.

For example, concrete demolition waste as raw material will be crushed and foreign materials like metal and wood extracted as is known per se. Hardened concrete from discarded paste is also crushed. Both need to be concentrated in C—S—H. For this they are divided into RCA and RCF by sieving, classification etc. to remove as much aggregate as possible. In a preferred embodiment the separation of hardened binder from aggregate is enhanced by concurrent abrasive treatment and carbonation as disclosed e.g. in WO 2014/154741 A1.

If needed, the recycled concrete fines are subjected to a further mechanical treatment to achieve a desired fineness of the solids in the starting material like a $D_{90}≤150$ µm, preferably a $D_{90}≤125$ µm, and most preferred a $D_{90}≤100$ µm, especially with a Rosin Rammler Parameter (slope) n from 0.4 to 1.4, preferably from 0.7 to 1.2. Other raw materials are treated as required to provide them with analogous fineness and amount of C—S—H. Some like washing water can be used as is or need a concentration in solids content.

In one preferred embodiment the starting material is blended with one or more additional material(s) that accelerates or modifies the carbonation and/or improves the properties of the final product(s). The additional material includes substances that accelerate the carbonation process like e.g. amines and alkalis and substances that influence the morphology of the calcium carbonate crystals like alkalis, sulfate, organic acids, amines and other. The additional material(s) can also be added to the starting material slurry or during the treatment of the raw material to provide the starting material. It is further possible to add one additional material at several points. Still further, different additional materials can be added at the same or at different points. Furthermore, some of the additional materials may play a double role: improve the mechanical treatment of the concrete fines and improve the carbonation and/or separation process.

The starting material, if the raw material was not already a slurry, is mixed with water to provide a starting material slurry with a solids:liquid ratio from 2:1 to 1:100, preferably from 1:1 to 1:50. It is possible that water has to be removed when e.g. a washing water used as raw material contains a too low amount of solids. For this known devices like filter presses and sedimentation techniques can be used.

In one embodiment the liquid removed from the third outlet of the gravity separation reactor, which is predominantly water, and/or water separated from the calcium carbonate additive slurry and/or from the $SiO_2$ rich SCM slurry removed from the first and/or second outlet of the reactor is used to make the starting material slurry, i.e. the water is circulated in the process.

The next step is carbonation of the starting material slurry, in particular direct wet carbonation. Preferably carbonation takes place at atmospheric pressure (although high-pressure is possible), and ambient temperature (although temperatures ranging from 10 to 99° C. are useful). The $CO_2$ can be provided as gas, as solid, as solution or as any combination thereof.

In one preferred embodiment gaseous carbon dioxide is used, preferably an exhaust gas. Suitable are exhaust gases from coal or gas fired power plants; exhaust gases from cement manufacturing, especially $CO_2$ rich exhaust gas from plants operating in the oxyfuel mode or from separate calcination, in particular indirect calcination; and carbon dioxide by-products or exhaust gases from industrial processes. Also carbon dioxide obtained from carbon capture processes is useful. The $CO_2$ concentration is not restricted, but higher concentrations are often easier to handle. Therefore, the concentration preferably ranges from 1 to 100 Vol.-%, more preferred from 2 to 95 Vol.-%, and most preferred from 5 to 90 Vol.-%.

In another preferred embodiment a carbon dioxide solution is used. In this case it is advantageous to use the $CO_2$ solution at least partly as mixing water to prepare the starting material slurry. Usually, a $CO_2$ concentration in the slurry ranging from 0.1 to 20 wt.-%, preferably from 0.5 to 10 wt.-%, most preferred from 1 to 5 wt.-%, is suitable. If a solution with high carbon dioxide concentration is used, additional water may be added to obtain the desired concentration. This water is preferably water recycled within the method according to the invention. If a combination of gaseous and dissolved carbon dioxide is used the concentration of the solution can be lower, e.g. down to 0.00001 wt.-% carbon dioxide or 0.0001 wt.-%, or 0.001 wt.-%, or 0.01 wt.-%.

In both embodiments the concentration of carbon dioxide can be easily increased by adding dry ice, i.e. solid carbon dioxide, when needed. Solid carbon dioxide can also be used alone as carbon dioxide.

The starting material slurry and carbon dioxide are fed to a gravity separation reactor for concurrent carbonation and separation into a calcium carbonate additive slurry, a $SiO_2$ rich SCM slurry, and liquid being mainly water. The reactor is adapted to subject the slurry to centrifugal motion. Feeding can occur separately via separate inlets or the carbon dioxide is added to the feed line for the slurry and/or (at least partly) pre-mixed with the slurry. The optimal process depends on the individual circumstances like available raw materials and carbon dioxide source and amounts to be processed among others.

The carbonation and separation take place in the same device with centrifugal forces ensuring a good dispersion of the $CO_2$ in the water and ready diffusion into the solid particles (e.g. recycled concrete fines) to form the two products. The separation is facilitated by the difference in densities and/or particle sizes of the calcium carbonate and (alumina) silica gel slurries. When a slurry with those particles is exposed to centrifugal motion their separation is possible.

Higher density particles in the heavy slurry have a density ranging from 2.50 to 3.10 g/cm$^3$, preferably from 2.55 to 3.05 g/cm$^3$ and most preferably from 2.60 to 3.00 g/cm$^3$. Lower density particles in the light slurry have a density ranging from 1.50 to 2.50 g/cm$^3$, preferably from 1.60 to 2.40 g/cm$^3$ and most preferred from 1.70 to 2.30 g/cm$^3$. The liquid is usually water with dissolved ions/suspended fine particles and has a density ranging from 1.0 to 1.2 g/cm$^3$, preferably from 1.0 to 1.1 g/cm$^3$.

The gravity separation reactor according to the invention can be any type of centrifuge like a sedimentation or a filtering centrifuge, a sedimentation centrifuge being preferred. The set-up and technology can be based on the principles of tubular bowl centrifuges, basket centrifuges, disc stack centrifuges and/or disc stack centrifuges with nozzles discharge. Such centrifuges are known in the art. However, simple centrifuges only separating one heavy from one light slurry/liquid as described e.g. in GB 2 076 316 A, are not suitable as gravity separation reactor.

The slurry fed into the reactor is immediately subjected to a high centrifugal force, causing the solids to settle on the inner surface of the reaction chamber at a rate which depends on the rotational speed employed. Normally the rotational speed ranges from 10,000 to 150,000 rev min$^{-1}$, preferably from 15,000 to 100,00 rev min$^{-1}$ and most preferred from 20,000 to 50,000 rev min$^{-1}$. The speed is adjusted to provide the desired separation depending on concentrations of solids and carbon dioxide in the slurry, residence time, temperature and pressure which all influence the particle sizes of the precipitating calcium carbonate.

The device can operate at room temperature, but also between 30 and 95° C. The carbonation-separation can take place preferably at atmospheric pressure, but also under vacuum or at an absolute pressure of up to 5 bar.

The device may include a pre-reactor to allow for example but not limited to homogenization and carbonation of the slurry before the centrifugation is initiated. A pre-reactor may also serve as mixing device, e.g. to add additional material(s) and/or for mixing starting material and water. If carbon dioxide is added before the slurry enters the gravity separation reactor, preferably not more than 40% of the intended carbonation takes place before feeding the slurry into the reactor, more preferred not more than 20%, most preferred not more than 10%. Intended carbonation means the carbonation degree to which the method, device and/or parameters of operation are adjusted to be achieved. For example, if the configuration of method, device and/or parameters is set for a carbonation degree of the C—S—H of 80%, then this is the intended carbonation. Consequently, reaction in the pre-reactor shall result in a carbonation degree of not more than 32%, preferably not more than 16% and most preferred not more than 8%.

It has already been proposed to apply centrifugation to separate water and solids after a carbonation reaction or to concentrate a product slurry thereof, see e.g. WO 2014/154741 A1 and WO 2019/093726 A1. However, these proposals using simple centrifuges like that described in GB 2 076 316 A do not allow to separate the carbonated slurry directly into a calcium carbonate additive slurry, a $SiO_2$ rich SCM slurry and liquid being mainly water. The method and device according to the invention constitute a much faster and easier solution.

According to the invention the slurry is carbonated and separated into three effluent streams inside the gravity separation reactor. Thus, the gravity separation reactor according to the invention has several advantages:
- it allows a direct wet carbonation,
- the turbulent flow allows a homogenization of the reactive bed, and
- it allows an in-situ separation of the of the main carbonation products: calcium carbonate and (alumina-)silica gel.

It is possible to include additional material into the carbonation, especially into a carbonation suspension of the wet process, that accelerates the carbonation process and/or improves the final properties of the SCM or the building material made with it. Preferably, substances for enhancing the carbonating process or mixtures of two or more thereof are used as additional material. Typically, additional material will be included in an amount from 0.001 to 1 wt.-% with respect to the total starting material.

Suitable materials include aqueous solvents like alkanolamines, for example primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or mixtures thereof, halogenides, ethylenedinitrilotetraaccetic acid (EDTA) or other substances that improve dissolution of $CO_2$ in the solution. Additionally enzymes such as carbonic anhydrase can be used to enhance carbonation efficiency and modify the properties of the reaction products. It is to be noted that these additions may have not only one action but can exercise a double role. They can e.g. modify the hydration process of the final binder as well as modify the carbonation process. The effect can largely depend on the dosage.

Moreover it is possible to add substances that regulate the pH during the carbonation process in order to enhance the precipitation of calcium carbonate. These include metal hydroxides, carbonates and similar substances.

Further, it is possible to add substances that modify the morphology of the precipitating calcium carbonate during the carbonation process. This provides the advantage of building less dense shales of hydrates-carbonates product and enables higher carbonation and hydration degrees. Suitable are for example magnesium salts, polyacrylic acid, polyacrylamide, polyvinyl alcohol, polyvinyl-sulfonic acids, styrene sulfonate, citric acid and other organic acids, polysaccharides and phosphonates, polycarboxylates.

Furthermore, it is possible to add admixtures that modify properties of the final building material made from the SCM or composite binder according to the invention already to the starting material or to the carbonation suspension (usually those will be added to the building material or composite binder). Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of water/binder ratio normally provides an increase of strength, such admixtures are commonly used. Air entraining agents are also able to improve flowability and can be used for this aim or are need for other reasons such as, but not limited to, density modifications, compactibility improvements etc.

Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxycarboxylic acids and their salts, phosphonates, sugars (saccharides). It is also possible to add admixtures that are designed to modify the rheology properties to control the setting time, i.e. plasticizers and super-plasticizers. Those can have a retarding impact as well, e.g. lignosulphonates, polycarboxylic acids, etc.

All admixtures are used in the amounts known as such, wherein the amount is adapted to a specific binder and special needs in the known manner. The calcium carbonate additive and $SiO_2$ rich SCM are characterized by different hydraulic diameters and densities that in turn permit an efficient gravity separation. The method according to the invention is much faster than previous approaches, typically the slurry passes through the reactor within 15 minutes, preferably within 5 minutes and most preferred within 2 minutes. It is a continuous process allowing conversion of much higher amounts of material than a batch method. The device according to the invention is moreover much less complicated than previous arrangements which reduces costs and required space.

The density and viscosity of the carbonation solution (liquid) can be adjusted to facilitate the separation by methods know by one skilled in the art.

The calcium carbonate additive and $SiO_2$ rich SCM are removed from the reactor separately at different outlets according to the difference in gravity. The calcium carbonate additive precipitates as reaction product from dissolved calcium ions and carbon dioxide and those particles have a higher density than the $SiO_2$ rich SCM remaining from dissolution/leaching of calcium from the starting material. The third outlet is for the liquid, it being understood that the liquid is mainly water with a small amount of—usually very fine—particles and dissolved material. The liquid can be e.g. at least 90 wt.-% water, or at least 95 wt.-% water or at least 98 wt.-% water. The $D_{90}$ of particles still present in the liquid is typically ≤50 μm, or ≤30 μm, or ≤10 μm. Especially in the embodiment recirculating the water this is no problem since the remaining particles and materials will eventually be removed with the calcium carbonate additive and $SiO_2$ rich SCM, respectively. However, the water can also be discarded. In contrast to water from prior concrete recycling steps the particles contained in the water exiting the gravity separation reactor are harmless and do not cause high pH values.

The calcium carbonate additive and $SiO_2$ rich SCM removed from the reactor are in the form of slurries. The water content in the product slurries varies widely, typically being in the range from 5 to 20 wt.-%. Usually the product slurries are separated into water and dry product, e.g. by filtering and/or pressing and drying the solids. The dry products may be de-agglomerated and/or ground if needed. Alternatively, the slurry can be used directly, for example in making hydraulic building materials like concrete wherein the contained water replaces (a part of) the mixing water.

The method according to the invention allows the transformation of hydrated cement paste still containing small aggregate (which is considered waste material today) into mainly calcite (other forms of the calcium carbonate are possible) and reactive amorphous silica, alumina and silica alumina gels, potentially hydrated. Furthermore, the reacted slurry is separated such that two main value added products are obtained: the fraction rich in calcium carbonate and the fraction rich in (alumina) silica gel. The properties and quality of both fractions can be adjusted through setting the carbonation conditions (solid concentration, $CO_2$ amount, etc.) and separation conditions (residence time, water flow, water/solids ratio, centrifugal motion speed etc.).

The calcium carbonate additive obtained according to the invention typically has particle sizes from 0.01 μm to 10 μm and contains 20-70 wt.-% or more of calcium carbonate. Depending on the used additives and the carbonation conditions calcite, vaterite or aragonite can be produced. Furthermore, amorphous and hydrated forms of calcium carbonate may be obtained. The size and the shape of the calcium carbonate may be further modified by the special additives.

The calcium carbonate additive can be used as high quality filler to produce cement and concrete or for industrial applications, e.g. but not limited to as filler for plastics or paints. It is noteworthy that the properties of the calcium carbonate (polymorphs, crystallinity, morphology, size) can be adapted to the intended application because of the flexibility offered by the carbonation/separation arrangement. Therefore, the calcium carbonate additive according to the invention is preferably used as filler in composite cements, in plastics and in paints. Suitable amounts of filler in composite cements range from 5 to 50 wt.-%, preferably from 10-35 wt.-%.

The $SiO_2$ rich SCM obtained according to the invention is characterized by an XRD amorphous structure. The surface area is typically >50 m²/g as measured by $N_2$ BET method. The particle sizes may vary, e.g. but not limited to, from 0.001 μm to 200 μm. The content of water is usually from 1 to 20 wt.-%. The water can be chemically or physically bound. The SCM is rich in silica gel, often also in alumina gel and/or in alumina silica gel. The gel content is at least 50 wt.-%, preferably more than 65 wt.-%, in $SiO_2$ rich SCM. The new synthetic SCM is characterized by improved high pozzolanic reactivity and consequently allows composite cements with higher compressive strength. Furthermore, the small quantity of calcium carbonate present provides synergies between calcium carbonate and alumina rich material when reacting in the cementitious matrix. Overall, this results in an appreciable evolution of compressive strength of a composite cement and significant possible reduction of the clinker content of such cement.

Therefore, the $SiO_2$ rich SCM according to the invention is preferably used to make composite cements, geopolymer binders and hydraulic building materials. Useful amounts in composite cements range from 5 to 95 wt.-% of the total binder mass, preferably from 10 to 70 wt.-% are used, most preferred from 20 to 60 wt.-%. The remainder is either cement or cement and 5 to 35 wt.-% filler. A binder from the composite cement is suitable for all uses known for Portland cement and composite cements with known SCM. As usual, admixtures and/or additives can be added in their usual amounts.

The main advantages of the method and device according to the invention are:
  significant sequestration potential of $CO_2$, e.g. $CO_2$ sequestration from cement plant stack
  simple, combined technological process
  enables valorization of waste materials into added value products
  widens resources for composite cement production

- possibility of using exclusively industrial wastes for valuable supplementary cementitious material and filler production
- high reactivity of obtained synthetic SCM allows high clinker replacement ratio and making more composite cement The invention will be illustrated further with reference to the figures that follow, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

Figure 1:
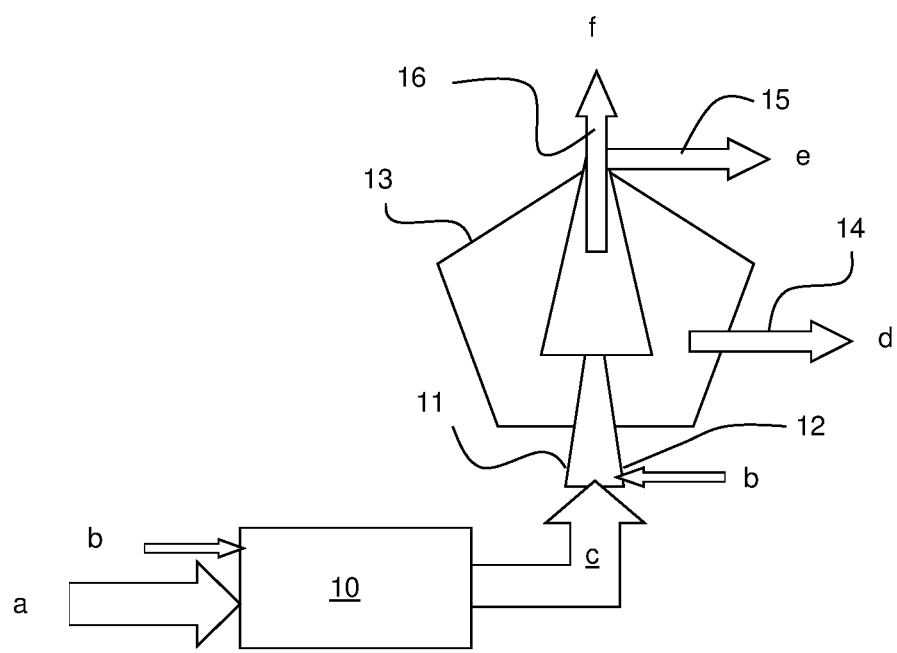
FIG. 1 shows a preferred embodiment of the device according to the invention.

FIG. 1 schematically shows a gravity separation reactor according to the invention. The reactor comprises a pre-reactor 10 receiving starting material slurry a and carbon dioxide b. The effluent c is a homogenized partially carbonated slurry. This is fed to inlet 11. Additional carbon dioxide b is introduced into the reaction chamber 13 via inlet 12. The slurry is subjected to centrifugal motion inside the reaction chamber 13. Thereby, the precipitating calcium carbonate particles move towards the first outlet 14 from which a calcium carbonate additive heavy slurry d is removed. The lower density $SiO_2$ rich particles move towards the second outlet 15 from which a light $SiO_2$ rich SCM slurry e is removed. The water moves upward and is removed through third outlet 16. Removed water f can be reused to provide the starting material slurry a.

Figure 2:
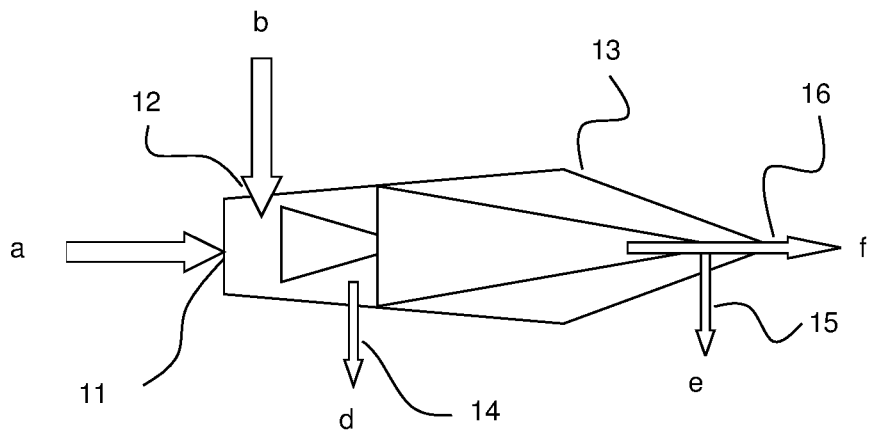
FIG. 2 shows another a preferred embodiment of the device according to the invention.

FIG. 2 schematically shows another gravity separation reactor. In contrast to the device in FIG. 1, the reactor chamber 13 is arranged horizontally. In this case, a starting material slurry a is fed to the reactor chamber 13 and gaseous carbon dioxide b is injected separately. Like in FIG. 1, the centrifugal motion of the slurry mixed with carbon dioxide inside the chamber 13 ensures fast reaction and separation into heavy slurry d containing most of the calcium carbonate and withdrawn through first outlet 14, a light slurry e containing most of the silica and alumina gel and withdrawn through the second outlet 15, and a liquid f being mainly water withdrawn at the third outlet 16.

Figure 3:
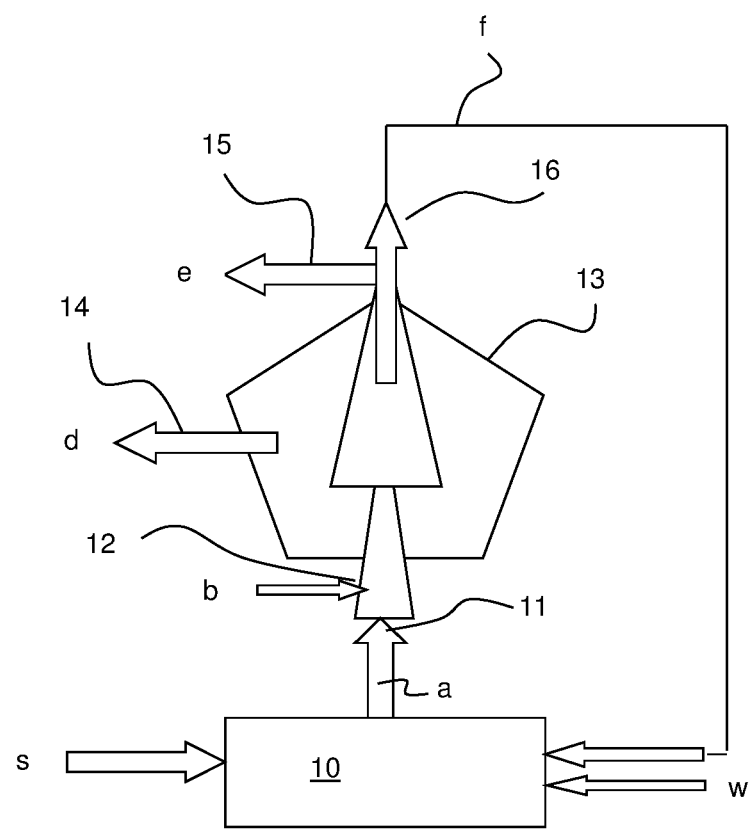
FIG. 3 shows a set-up for carrying out the method according to the invention.

A process scheme using a vertical gravity separation reactor as shown in FIG. 1 is depicted in FIG. 3. Here, the liquid f removed from the outlet 16 is recirculated into a pre-reactor 10, mainly serving to obtain the starting material slurry a by mixing the starting material solids s with liquid. No additional carbon dioxide is added to the pre-reactor 10 here, but liquid f still contains some carbon dioxide that has not reacted in the chamber 13. Alternatively, this could be separated from the liquid f in an additional device before the water is recirculated, e.g. in a separator based on the action of centrifugal motion. In addition to liquid f some water w is introduced into the pre-reactor 10. Water w is at least partly fresh water and can comprise water separated from slurry d and/or e.

REFERENCE NUMBERS a starting material slurry
b carbon dioxide
c carbon dioxide containing starting material slurry
d high density calcium carbonate additive slurry
e low density $SiO_2$ rich SCM slurry
f liquid
s solids
w water
10 pre-reactor
11 starting material slurry inlet
12 carbon dioxide inlet
13 reactor chamber
14 first outlet
15 second outlet
16 third outlet

The invention claimed is:

1. A method for converting a starting material containing waste materials and/or by-products, selected from the group consisting of concrete demolition waste, material left over from concreting, slag, ash, muds, and mixtures thereof, wherein the starting material contains at least 40 wt.-% of calcium silicon (hydr)oxide phases and calcium aluminum (hydr)oxide phases, said phases being selected from the group consisting of calcium silicon hydrates, alite, belite, rankinite, wollastonite, hydrogarnet, ettringite, calcium aluminum hydrates, calcium silicon/aluminum (hydr)oxides with additional elements, and mixtures thereof, into an $SiO_2$ rich supplementary cementitious material and a calcium carbonate additive comprising the steps of:
    providing the starting material with a $D_{90}$ of ≤1 mm;
    mixing the starting material with water or adjusting a water content of the starting material to provide a starting material slurry having a solid: liquid ratio from 2:1 to 1:100;
    passing the starting material slurry into a gravity separation reactor together with carbon dioxide;
    subjecting the starting material slurry and carbon dioxide to centrifugal motion provided by adjusting a rotational speed to range from 10,000 to 150,000 rev min-inside the reactor; and
    removing a heavy slurry of higher density particles comprising the calcium carbonate additive formed by reaction of carbon dioxide with calcium ions dissolved or leached from the starting material from a first outlet of the reactor, removing a light slurry of lower density particles comprising the undissolved $SiO_2$ rich remains of the starting material from a second outlet of the reactor, and removing liquid from a third outlet of the reactor.

2. The method according to claim 1, wherein the starting material has a $D_{90}$ of ≤500 μm.

3. The method according to claim 1, wherein the starting material comprises at least 50 wt.-% of calcium silicon (hydr)oxide phases and calcium aluminum (hydr)oxide phases.

4. The method according to claim 1, wherein the carbon dioxide is at least partly introduced in gaseous form with a concentration from 1 to 100 Vol.-%.

5. The method according to claim 1, wherein the carbon dioxide is at least partly introduced in the form of a solution with a concentration from 0.1 to 20 wt.-%.

6. The method according to claim 1, wherein the carbon dioxide gas is an exhaust gas.

7. The method according to claim 1, wherein the liquid removed from the third outlet of the reactor is used to at least partly replace water for mixing with the starting material to form the starting material slurry.

8. The method according to claim 2, wherein the starting material slurry has a $D_{90}$ of ≤250 μm.

9. The method according to claim 2, wherein the starting material slurry has a $D_{90}$ of ≤125 μm.

10. The method according to claim 1, wherein the starting material is obtained from concrete demolition waste and/or material left over from concreting.

11. The method according to claim 3, wherein the starting material comprises at least 60 wt.-%, of calcium silicon (hydr)oxide phases and calcium aluminum (hydr)oxide phases.

12. The method according to claim 1, wherein the starting material comprises at least 70 wt.-% of calcium silicon (hydr)oxide phases and calcium aluminum (hydr)oxide phases.

13. The method according to claim 4, wherein the carbon dioxide concentration ranges from 5 to 90 Vol.-%.

14. The method according to claim 5, wherein the carbon dioxide concentration ranges from 0.5 to 10 wt.-%.

15. The method according to claim 6, wherein the exhaust gas is from cement manufacturing and/or from a gas fired power plant and/or a coal fired power plant.

16. The method according to claim 8, wherein the starting material is obtained from concrete demolition waste and/or material left over from concreting and comprises at least 60 wt.-%, of calcium silicon (hydr)oxide phases and calcium aluminum (hydr)oxide phases.

\* \* \* \* \*